(12) United States Patent
Miura et al.

(10) Patent No.: US 6,640,039 B1
(45) Date of Patent: Oct. 28, 2003

(54) OPTICAL WAVEGUIDE ARRAY AND METHOD OF MANUFACTURING THE SAME

(75) Inventors: Kiyotaka Miura, Nara (JP); Yuki Kondo, Nara (JP); Kazuyuki Hirao, Kyoto-fu (JP)

(73) Assignee: Central Glass Co., Ltd., Yamaguchi-Ken (JP)

( * ) Notice: Subject to any disclaimer, the term of this patent is extended or adjusted under 35 U.S.C. 154(b) by 0 days.

(21) Appl. No.: 09/601,811

(22) PCT Filed: Jan. 29, 1999

(86) PCT No.: PCT/JP99/00377

§ 371 (c)(1), (2), (4) Date: Jan. 12, 2001

(87) PCT Pub. No.: WO99/41625

PCT Pub. Date: Aug. 19, 1999

(30) Foreign Application Priority Data

Feb. 12, 1998 (JP) .............................. 10-029872

(51) Int. Cl.⁷ ................................................. G02B 6/10
(52) U.S. Cl. ....................... 385/129; 385/123; 385/141; 65/386
(58) Field of Search ................................. 385/129, 123, 385/141; 65/386, 388, 389, 392, 129

(56) References Cited

U.S. PATENT DOCUMENTS

| | | | | |
|---|---|---|---|---|
| 4,849,036 A | * | 7/1989 | Powell et al. ................. | 156/99 |
| 5,694,249 A | * | 12/1997 | Misawa ....................... | 359/620 |
| 5,978,538 A | * | 11/1999 | Miura et al. ................. | 385/123 |
| 6,129,723 A | * | 10/2000 | Anderson et al. ............. | 606/13 |

FOREIGN PATENT DOCUMENTS

| | | |
|---|---|---|
| EP | 0 797 112 A1 | 3/1997 |
| JP | 57-208511 A | 12/1982 |
| JP | 62-007005 A | 1/1987 |
| JP | 63-128303 A | 5/1988 |
| JP | 01-180180 A | 7/1989 |
| JP | 02-251907 A | 10/1990 |
| JP | 03-038963 A | 2/1991 |
| JP | 09-178901 A | 7/1997 |
| JP | 09-311237 A | 12/1997 |
| WO | WO 96/09563 A1 | 3/1996 |

* cited by examiner

Primary Examiner—Frank G. Font
Assistant Examiner—Kaveh C Kianni
(74) Attorney, Agent, or Firm—Webb Ziesenheim Logsdon Orkin & Hanson PC

(57) ABSTRACT

A glass containing one or more of metal microparticles, semiconductor microparticles, transition metal ion, rare earth ion and anion with characteristic absorption in a wavelength region longer than 360 nm is irradiated with a pulsed laser beam condensed at a focal point preset in an inner part of the glass. The condensed irradiation induces change of a refractive index as well as decrease of characteristic absorption in the wavelength region longer than 360 nm at the focal point. Such the domain is continuously formed by relatively shifting the focal point with respect to the glass. The continuous domains serve as optical waveguides, since optical properties are greatly different between the irradiated part and the non-irradiated part.

4 Claims, 4 Drawing Sheets

OPTICAL WAVEGUIDE ARRAY AND METHOD OF MANUFACTURING THE SAME

TECHNICAL FIELD OF THE INVENTION

The present invention relates to an optical waveguide array having the structure that a plurality of domains where characteristic absorption in a wavelength region longer than 360 nm decreases together with change of a refractive index are continuously formed in inner parts of material, and a method of manufacturing such the optical waveguide array.

BACKGROUND OF THE INVENTION

An optical waveguide array having optical fibers installed in a substrate is used as a means for digital and/or image data in an optical communication system. A conventional optical fiber has the structure that a core of a higher refractive index is surrounded with a cladding layer. Due to such the structure, incident light which is emitted to the optical fiber with an angle less than a numerical aperture (NA) repeats total reflection at an interface between the core and the cladding layer, to transmit image data toward an outlet of the optical fiber.

However, light which is emitted to the optical waveguide array with an incidence angle greater than a value corresponding to the numerical aperture (NA) does not perform total reflection at the interface between the core and the cladding layer, but travels through the cladding layer to an adjacent optical fiber. Light emitted to the cladding layer also travels through the cladding layer and the core, and reaches the opposite side. Such the unfavorable travelling causes occurrence of so-called "cross-talk" that the light travels in the part where travelling shall be originally forbidden, resulting in frequent occurrence of errors in transmission of digital data, and decrease of contrast as well as degrading of image in case of transmission of image data.

Cross-talk is suppressed by provision of a light absorber between optical fibers of an optical waveguide array to absorb leaked light, as disclosed in JP 1-180180A and JP 3-38963A. In such an optical waveguide array (as shown in FIGS. 1A, 1B and 1C, herein collectively referred to as FIG. 1), each core 1a is surrounded with a cladding layer 1b and a light-absorbing layer 1c, a plurality of the optical fiber 1 are bound together as bundles 2, and each bundle 2 is individually sandwiched between substrates 3 such as glass. Since leaked light is separated by the light-absorbing layer 1c, an image is not degraded of contrast during travelling, so that an image sensor capable of reading image data with high resolution is offered.

However, there are restrictions on material of the light-absorbing layer 1c, since the optical fiber 1 covered with the light-absorbing layer 1c shall be good of adhesiveness to glass. In addition, a very complicated process is necessitated due to formation of the light-absorbing layer 1c as well as adhesion of bundled optical fibers 1 to the substrates 3.

European Patent No. 0797112A discloses production of an optical waveguide by irradiation of a glass sample with a laser beam condensed at a focal point in an inner part of the glass sample to partially increase a refractive index at the focal point. In this method, a quartz or fluoride glass is irradiated with a condensed laser beam to form an optical waveguide. Production of an optical waveguide array is anticipated in course of developing such the method to enable formation of optical waveguides in an arrayed state. However, condensed irradiation with the laser beam merely induces change of an refractive index, but cross-talk is still unresolved. Consequently, image data are transmitted in a degraded state with poor contrast.

SUMMARY OF THE INVENTION

The present invention aims at elimination of above-mentioned problems. An object of the present invention is to provide a new optical waveguide array having the inner structure that a plurality of domains where a change of a refractive index as well as decrease of characteristic absorption in a longer wavelength region occur are continuously formed by irradiating a glass, which contains an absorbing material with characteristic absorption in the longer wavelength, with a pulsed laser beam condensed at a focal point preset in inner parts of the glass.

An optical waveguide array according to the present invention comprises a glass matrix containing an absorbing material with characteristic absorption in a wavelength region longer than 360 nm, and a plurality of domains, where change of a refractive index as well as decrease of characteristic absorption in a wavelength longer than 360 nm occur due to transition of the absorbing material caused by irradiation with a pulsed laser beam condensed at a focal point preset in inner parts of a glass, are continuously formed in the matrix. The absorbing material may be one or more of metal microparticles, semiconductor microparticles, transition metal ions, rare earth ions and anions.

The optical waveguide array is fabricated as follows: A pulsed laser beam with an energy capable of inducing change of a refractive index as well as decrease of characteristic absorption in a wavelength region longer than 360 nm is emitted to a glass containing an absorbing material with characteristic absorption in the wavelength region longer than 360 nm, in the manner such that a focal point of the pulsed laser beam is adjusted to an inner part of the glass. Such irradiation is continued while relatively shifting the focal point in the glass, so as to form a continuous domain where change of the refractive index as well as decrease of characteristic absorption in a wavelength region longer than 360 nm occur in the inner part of the glass. Such the domain serves as an optical waveguide. After the focal point is relocated, the same irradiation is repeated to form a plurality of optical waveguides.

When a glass containing an absorbing material with characteristic absorption in a longer wavelength region is irradiated with a pulsed laser beam condensed at a focal point preset in an inner part of the glass, change of the refractive index as well as transition of the absorbing material occur at the focal point. Such an absorbing material as metal microparticle, semiconductor microparticle, transition metal ion, rare earth ion or anion has characteristic absorption in a wavelength region longer than 360 nm. Condensed irradiation with the pulsed laser beam also changes a number of metal microparticle or semiconductor microparticle, and a size or transformation of the microparticle. Such the condensed irradiation also changes valence, coordination and integration of transition metal ion, rare earth ion or anion.

For instance, when a glass dispersing metal microparticles or semiconductor microparticles therein is irradiated with a condensed pulsed laser beam, the microparticles are decreased in number, reduced in size, or dissolved or ionized in a glass matrix.

Absence of the microparticles due to such dissolution or ionization causes decrease of an absorption coefficient to the same value as that of a glass free from dispersion of the microparticles, compared with a level before irradiation.

Change of the microparticles in size causes change of absorption wavelength, i.e. decrease of an absorption coefficient compared with a level before irradiation.

A part subjected to condensed irradiation increases its refractive index compared with the other part which is not subjected to condensed irradiation, due to structural re-arrangement caused by the condensed irradiation, so that structure of an optical waveguide is formed in the glass. When a laser beam for transmission of image data with wavelength adjusted to a wavelength region of characteristic absorption is emitted to the processed glass, the laser beam travels along the optical waveguide at a high efficiency, since an absorption coefficient is decreased at the focal point while the other part keeps its original absorption coefficient before the condensed irradiation. In addition, light leaked out of the waveguide (the irradiated part) is trapped in the non-irradiated part, so as to inhibit occurrence of errors in data transmission. Consequently, image data can be read out with high resolution without degrading of contrast.

PREFFERED EMBODIMENT OF THE PRESENT INVENTION

Figure 1A:
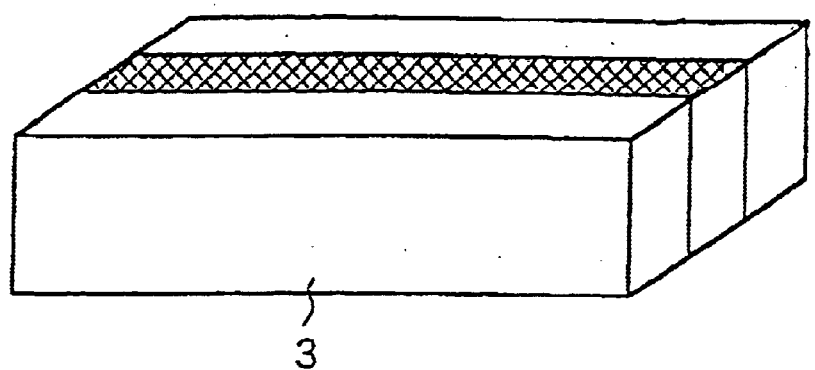
FIG. 1 is a schematic view illustrating a conventional optical fiber array.
Figure 1B:
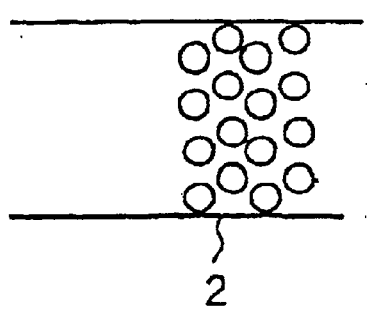
Figure 1C:
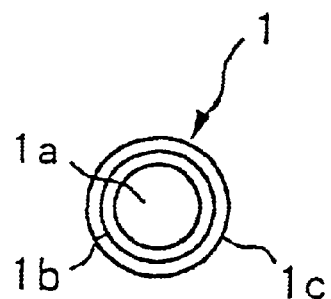

Metal microparticles to be dispersed in a glass for an optical waveguide array may be Au, Ag, Cu or Pt. Semiconductor microparticles may be CdS, CdSe, CdTe, CuCl, CuBr, ZnS or ZnSe. These microparticles may be dispersed solely or combinatively in a glass.

Condensed irradiation of a glass containing transition metal ion, rare earth ion or anion with a pulsed laser beam induces change of ion valence, a coordination state, an integrated state and so on. Characteristic absorption before the irradiation is eliminated or decreased due to such change. The condensed irradiation with the pulsed laser beam forms such the optical waveguide structure, that a refractive index at the irradiated part is higher than a value at the non-irradiated part, in an inner part of the glass. Travelling of a light signal along the optical wave guide (the irradiated part) is performed with a high efficiency, and occurrence of errors in data transmission is prevented by trapping a beam leaked out of the optical waveguide in the non-irradiated part. Consequently, an optical device capable of reading image data with high resolution without degrading of contrast is offered.

One or more of $Cu^{2+}$, $V^{3+}$, $V^{4+}$, $Ti^{3+}$, $Ni^{2+}$, $Co^{2+}$, $Fe^{2+}$, $Fe^{3+}$, $Mn^{2+}$, $Mn^{3+}$, $Cr^{3+}$, $Cr^{6+}$ and $Mo^{4+}$ may be included as transition metal ion in a glass. One or more of $Pr^{3+}$, $Nd^{3+}$, $Sm^{3+}$, $Eu^{3+}$, $Dy^{3+}$, $Ho^{3+}$, $Er^{3+}$, $Tm^{3+}$, $Yb^{3+}$, $Ce^{3+}$, $Sm^{2+}$, $Eu^{2+}$ and $Yb^{2+}$ may be included as rare earth ion in the glass. One or more of $OH^-$, $O^{2-}$ and $F^-$ may be included as anion in the glass.

A waveguide is formed by emitting a pulsed laser to a glass containing an absorbing material with characteristic absorption in a wavelength region longer than 360 nm in the manner such that a focal point of the pulsed laser beam is preset in an inner part of the glass, and relatively shifting the focal point in the inner part of the glass so as to form a continuous domain where change of a refractive index as well as decrease of characteristic absorption in the wavelength longer than 360 nm occur. If a glass containing an absorbing material with characteristic absorption in a wavelength region shorter than 360 nm is irradiated with a pulsed laser beam on the contrary, leaked signal light of wavelength generally longer than 360 nm would not be absorbed in non-irradiated glass matrix resulting cross-talk. Furthermore, decrease of the characteristic absorption effective for a waveguide is hardly realized since the glass itself often has characteristic absorption in the wavelength region shorter than 360 nm. However, a glass containing an absorbing material may be available for fabrication of an optical waveguide array, as far as condensed irradiation with a pulsed laser beam induces decrease of characteristic absorption of the absorbing material in a wavelength region longer than 360 nm, with the proviso that a tail of the absorption overlaps a wavelength region longer than 360 nm even if a peak of characteristic absorption is shorter than 360 nm and that the glass containing such the absorbing material has a higher absorption coefficient in a wavelength region longer than 360 nm compared with a glass which does not contain such the absorbing material.

A pulsed laser beam with an energy sufficient for inducing change of a refractive index as well as decrease of characteristic absorption in a wavelength region longer than 360 nm is used for formation of a waveguide, although the energy depends on a kind of a glass. A peak power of the pulsed laser beam is represented by a power (W) which is a value of an output energy (J) per one pulse divided by pulse width (second), and a peak powder density is represented by a value(W/cm$^2$) of a peak power per a unit area (cm$^2$).

A peak power density is preferably within a range of $10^5$–$10^{15}$ W/cm$^2$ at a focal point in order to induce change of a refractive index as well as decrease of characteristic absorption in a wavelength region longer than 360 nm. If the peak power density is less than $10^5$ W/cm$^2$, change of a refractive index and decrease of characteristic absorption in a wavelength region longer than 360 nm hardly occur at the focal point. If the peak power density exceeds $10^{15}$ W/cm$^2$ on the contrary, change of a refractive index as well as decrease of characteristic absorption in a wavelength region longer than 360 nm unfavorably occur at the other part except the focal point. Besides, it is practically difficult to emit a laser beam with an excessively big energy.

When a glass is irradiated with a pulsed laser beam with the same peak power density, the possibility to induce change of a refractive index as well as decrease of characteristic absorption in a wavelength region longer than 360 nm is intensified as narrower pulse width of the pulsed laser beam. In this sense, narrower pulse width is better, and is preferably $10^{-16}$ second or shorter. If a glass is irradiated with a pulsed laser beam with too wider pulse width, emission of a pulsed laser beam with an excessively big energy is necessitated in order to gain the similar peak power density as that of a pulsed laser beam with narrower pulse width. Application of such the big energy causes fracture of the glass. If a glass is irradiated with a pulsed laser beam with wavelength in an absorption wavelength region of the glass, intensity of the pulsed laser beam becomes weaker as the pulsed laser beam travels in the glass along its depth direction. However, any special restrictions are not put on wavelength of a pulsed laser beam, as far as an energy with a predetermined peak power density is applied to a part of a glass which is expected to form an optical waveguide.

A pulsed laser beam with narrower pulse width, i.e. a greater repetition rate is preferable for formation of a smooth waveguide structure, so as to apply a first pulse and then a second pulse in a possible shortest time period. In this sense, a repetition rate of a pulsed laser beam is 10 kHz or more (preferably 100 kHz or more).

A pulsed laser beam with too small repetition rate is discretely emitted to a glass without induction of change of a refractive index necessary for formation of a continuous optical waveguide. A glass can be subjected to continuous irradiation with a pulsed laser beam by lowering a relative velocity of a glass or a focal point. However, since a second pulse is applied in an overlapping state after lapse of a predetermined time period from application of a first pulse, a part where the first pulse induced change of a refractive index would be unfavorably deformed by application of the second pulse. Such deformation causes rugged structure of an optical waveguide.

An upper limit of a repetition rate is indefinite, and a pulsed laser beam limitlessly similar to continuous light may be used. However, an energy per one pulse becomes weaker as increase of a repetition rate . In this sense, the upper limit of the repetition rate is practically determined accounting a threshold which induces change of a refractive index in a glass as well as decrease of characteristic absorption in a wavelength region longer than 360 nm in comparison with an output of a pulsed laser beam to be emitted.

When a glass with characteristic absorption in a wavelength region longer than 360 nm is irradiated with a pulsed laser beam in the manner such that a focal point of the pulsed laser beam is preset in an inner part of the glass, a quantity of light necessary for inducing change of a refraction index as well as transition of an absorbing material (i.e. the characteristic absorption cause) is not gained at the other part except the focal point. Consequently, change of a refractive index as well as decrease of characteristic absorption in a wavelength region longer than 360 nm selectively is limited to the focal point, while the glass keeps its original refractive index and an original state of the absorbing material at the other part except the focal point (a non-irradiated part). Due to such selective reformation, an optical waveguide structure is formed in an inner part of the glass.

Figure 2:
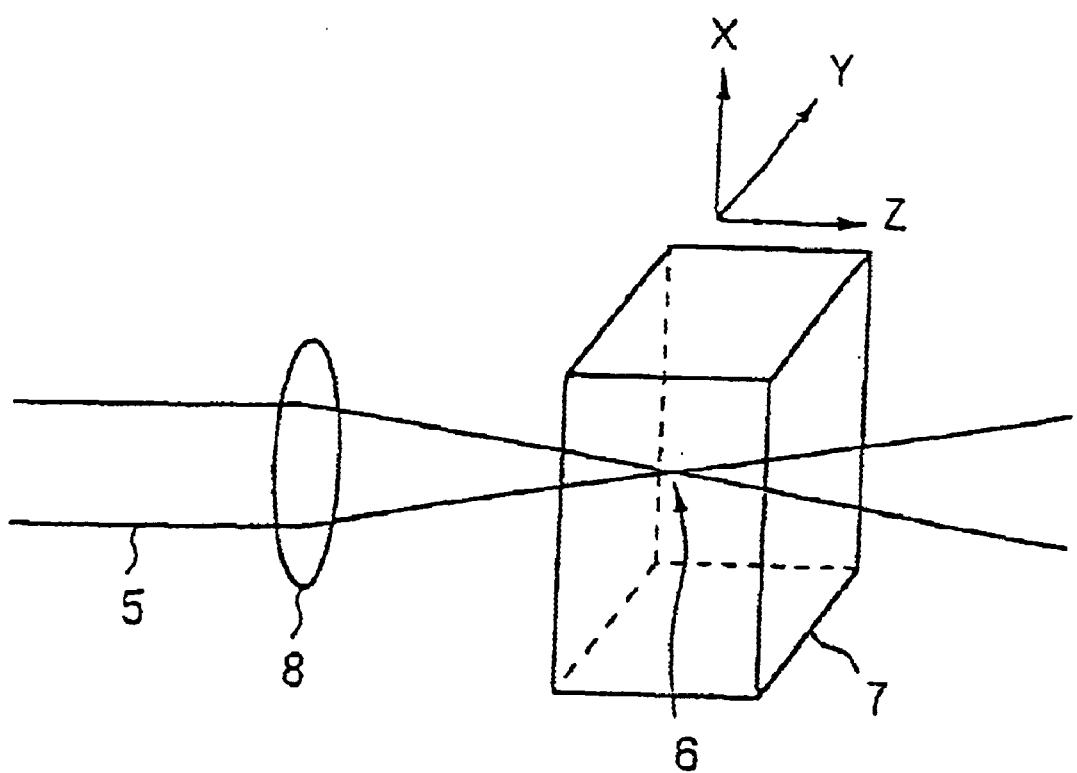
FIG. 2 is a view for explaining irradiation of a glass having characteristic absorption in a wavelength region longer than 360 nm with a pulsed laser beam condensed at a focal point preset in an inner part of the glass.

A pulsed laser beam 5 emitted from a light source is condensed by a condenser lens 8 or the like so as to position its focal point 6 at an inner part of a glass 7, as shown in FIG. 2. A domain where change of a refractive index as well as decrease of characteristic absorption in a wavelength region longer than 360 nm occur is continuously formed in the inner part of the glass 7, by relatively shifting the focal point 6 in the glass 7. Relative movement of the focal point 6 with respect to the glass 7 may be performed by continuously shifting the glass 7 with respect to the focal point 6 of the pulsed laser beam 5, continuously shifting the focal point in the glass 7, or shifting both the focal point 6 and the glass 7.

Since the domain where change of a refractive index as well as decrease of characteristic absorption occur is continuously formed in the inner part of the glass 7, such the domain serves as an optical waveguide 11 (as shown in FIG. 3). A core diameter of the optical waveguide 11 is controlled by the focal distance of the condenser lens 6.

Figure 3A:
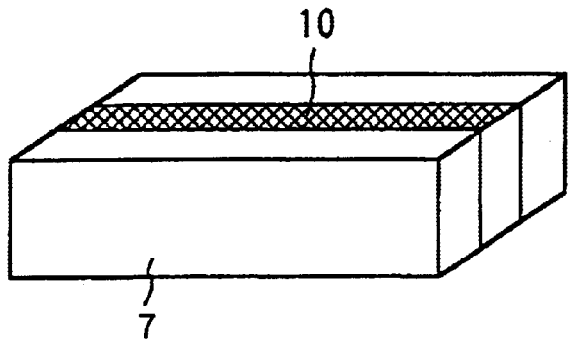
FIG. 3A is a perspective view illustrating an optical waveguide array in Example of the present invention.
Figure 3B:
FIG. 3B is a sectional view illustrating the same optical waveguide array.

A glass substrate 7 with characteristic absorption in a wavelength region longer than 360 nm is used for fabrication of an optical waveguide array having a profile shown in FIG. 3A and a cross section shown in FIG. 3B.

A first optical waveguide 11 is formed in a first step wherein a focal point 6 of a pulsed laser beam 5 is relatively shifted in an inner part of a glass 7. The focal point 6 is then relocated to another position different from an initial point of the first optical waveguide 11 and shifted in the inner part of the glass 7 along a direction parallel to the first optical waveguide 11, to form a second optical waveguide 12 in a second step. Relocation and shifting of the focal point 6 are repeated thereafter in the same way to form an optical waveguide array 10 comprising a plurality of optical waveguides indicated by 11 and 12. parallel together. The inner part (irradiated part) of the glass 7 where the optical waveguides 11 and 12 . . . are formed changes its refractive index and decrease of characteristic absorption in a wavelength region longer than 360 nm, while the other part 19 (non-irradiated part) keeps its original refractive index without decrease of characteristic absorption.

When a laser beam for transmission of image data with wavelength predetermined in a wavelength region corresponding to characteristic absorption of the non-irradiated part 19 (glass matrix) is emitted to the waveguide array 10, the incident beam travels through the optical waveguides 11 and 12 . . . with high performance, since an absorption coefficient at the irradiated part (corresponding to the focal point 6) is decreased while the non-irradiated part 19 keeps its original absorption coefficient. The laser beam leaked out of the optical waveguides 11 and 12 . . . is trapped in the non-irradiated part 19. As a result, the image data can be read out with high resolution without occurrence of crosstalk which causes data errors or degrading of contrast.

EXAMPLE 1

Fabrication of an Optical Waveguide Array From a Glass Dispersing Au Microparticles Therein $SiO_2$, $B_2O_3$, $Na_2CO_3$ and $Sb_2O_5$ raw materials were weighed and mixed together, and an aqueous chloroauric acid solution was added to the powdery mixture to prepare glass composition of 72 parts by weight $SiO_2$, 18 parts by weight $B_2O_3$, 10 parts by weight $Na_2O$, 4 parts by weight $Sb_2O_3$ and 0.02 parts by weight Au.

The powdery mixture (400 g) was put in a Pt crucible of 300 cc capacity, and melted under tilting condition 2 hours at 1450° C. in the open air. Uniform glass melt was shaped to a sheet of 5 mm in thickness by molding it in a brass die, and then cooled. The glass sheet obtained was annealed at 450° C. to release strains.

The glass sheet was set in an electric oven, heated at 5° C./minute, held 8 hours at 700° C., and then cooled as such in the oven to precipitate Au microparticles in the glass. The glass was colored to dark-red due to precipitation of Au microparticles. After the heat-treated glass was trimmed and ground, a parallelepiped sample of 10 mm in length, 10 mm in width and 2 mm in thickness was cut off the glass sheet.

The sample was examined by absorption spectrum analysis. Its permeability to light of wavelength shorter than 580 nm was 0%.

The glass sample 7 was mounted on an electromotive stage capable of moving along X, Y and Z directions, and irradiated with a pulsed laser beam 5 in the manner such that a focal point 6 of the pulsed laser beam 5 was adjusted to an inner part of the glass sample 7 by a condenser lens 8. The focal point 6 was shifted with respect to the glass sample 7 along the Z direction (corresponding to an optical axis of the laser beam 5), without movement of the focal point 6 along the X and Z directions. A pulsed laser beam 5 (800 nm wavelength, pulse width of $1.5 \times 10^{-13}$ second, a repetition rate of 200 kHz and an averaged power of 500 mW) oscillated from a Ti-sapphire laser excited with an argon laser was used as the pulsed laser beam 5.

Increase of a refractive index by 0.01 at the focal point 6 was recognized by observation of the irradiated glass sample 5. Change of a refractive index as well as decrease of characteristic absorption in a wavelength region longer tan 360 nm occurred in a very short time period of nanosecond or picosecond order.

The glass sample 7 and/or the focal point 6 were relatively shifted along the Z direction (an optical axis) to form a straight domain (i.e. a first optical waveguide 11) with an increased refractive index was formed in an inner part of the glass sample 7.

Figure 6A:
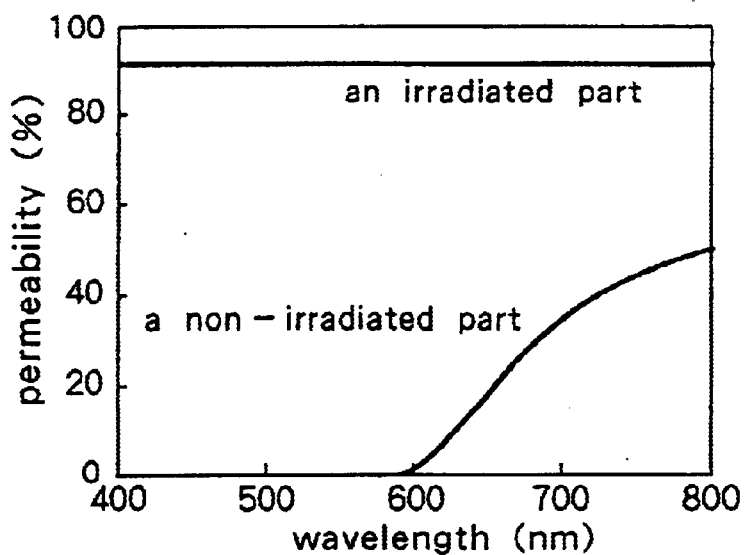
FIG. 6A is a graph showing a absorption spectrum of a glass dispersing Au microparticles therein at a part irradiated with a condensed laser beam in comparison with a non-irradiated part.

Formation of the optical waveguide 11 was confirmed by actually emitting a laser beam of 800 nm wavelength to the glass sample 7 and detecting travel of the laser beam only through the domain where change of a refractive index occurred. A near-field image at the outlet side proved that the optical guide wave 11 had cross section of 15 $\mu$m in diameter (core diameter). FIG. 6A shows a measurement result of absorption spectrum of the optical waveguide 11. It is noted from FIG. 6A that the optical waveguide 11 was defined by a domain where an absorption coefficient in a wavelength region of approximately 580–400 nm caused by Au microparticles decreased and dark-red disappeared. On the other hand, change of permeability was not detected at the non-irradiated part 19.

A core diameter of the optical waveguide 11 was controlled by changing a focal distance of the condenser lens 8. In the case where the glass sample 7 was irradiated with another pulsed laser beam of different wavelength (e.g. 1.3 $\mu$m or 1.55 $\mu$m in a wavelength region for commercial communication) instead of the pulsed laser beam 5 of 800 nm, the same change of a refractive index as well as the same decrease of characteristic absorption in a wavelength longer than 360 nm were also detected.

After the glass sample 7 was shaded from irradiation with the pulsed laser beam 5, the glass sample 7 and/or the focal point 6 were relocated. The glass sample 7 and/or focal point 6 were then shifted along a direction in parallel to the first optical waveguide 11, to form a second optical waveguide 12. Relocation and shifting of the glass sample 7 and/or the focal point 6 were repeated to fabricate an optical waveguide array 10 having the structure that a plurality of optical waveguides such as those indicated by 11 and 12 . . . are arranged in parallel together and surrounded with a non-irradiated part 19 which kept its original refractive index without change of characteristic absorption.

The optical waveguide array 10 obtained in this way was examined by a test to research read-out contrast using a laser beam of 550 nm wavelength. It was confirmed that the optical waveguide array performed extremely high contrast without cross talk, compared with an optical waveguide array which was fabricated using change of a refractive index only in under-mentioned Comparative Example 1.

EXAMPLE 2

Fabrication of an Optical Waveguide Array From a Glass Dispersing Cu Microparticles Therein $SiO_2$, $B_2O_3$, $Na_2CO_3$, $Cu_2O$, SnO raw materials were weighed and mixed together to prepare glass composition of 72 parts by weight $SiO_2$, 20 parts by weight $B_2O_3$, 8 parts by weight $Na_2O$, 0.5 parts by weight Cu and 0.25 parts by weight SnO.

The powdery mixture (400 g) was melted with a heat and shaped to a sheet of 6 mm in thickness by the same way as Example 1. The glass sheet was annealed at 450° C. to release strains. The annealed glass sheet was set in an electric oven, heated at 5° C./minute, held 4 hours at 650° C., and then cooled as such in the oven to precipitate Cu microparticles in a glass matrix. The glass sheet was colored to red due to precipitation of Cu microparticles. After the heat-treated glass sheet was trimmed and ground, a sample of 10 mm in length, 10 mm in width and 4 mm in thickness was cut off the glass sheet.

The sample was examined by absorption spectrum analysis. Its permeability to light of wavelength shorter than 620 nm was 0%.

The glass sample 7 was irradiated with a condensed pulsed laser beam 5 by the same way as Example 1. Increase of a refractive index by 0.01 at the focal point 6 was detected by observation of the irradiated glass sample 7. Decrease of characteristic absorption in a wavelength region longer than 360 nm was also noted in Example 2, regardless very short irradiation of nanosecond or picosecond order. A straight optical waveguide 11 was formed in an inner part of the glass sample 7 by continuously shifting the glass sample 7 and/or the focal point 6 along the Z direction (an optical axis).

Figure 6B:
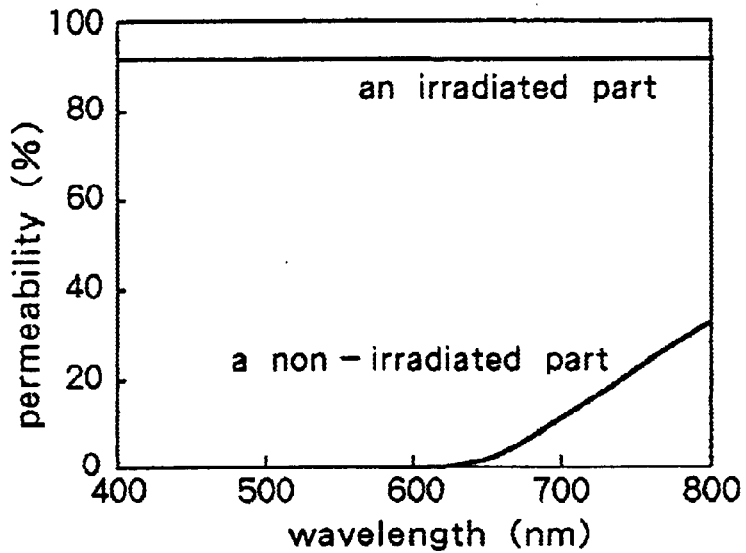
FIG. 6B is a graph showing a absorption spectrum of a glass dispersing Cu microparticles therein at a part irradiated with a condensed laser beam in comparison with a non-irradiated part.

A near-field image at an outlet side proved that the formed optical waveguide 11 had cross section of 15 $\mu$m in diameter (core diameter). FIG. 6B shows a measurement result of absorption spectrum of the optical waveguide 11. FIG. 6B proves formation of a domain where an absorption coefficient in a wavelength region of approximately 620–400 nm caused by Cu microparticles decreased and red color disappeared. On the other hand, change of permeability was not detected at the non-irradiated part 19.

Second and following optical waveguides indicated by 12 . . . were formed by the same way as Example 1 after formation of the first optical waveguide 11, to fabricate an optical waveguide array (shown in FIG. 4) having the structure that a plurality of optical waveguides indicated by 11 and 12 . . . were arranged in parallel together and surrounded with the non-irradiated part 19 which kept its original refractive index without decrease of characteristic absorption. The optical waveguide array 10 obtained in this way was examined by a test to research read-out contrast using a laser beam of 530 nm wavelength. It was confirmed that the optical waveguide array performed extremely high contrast, compared with an optical waveguide array (under-mentioned Comparative Example 1) which was fabricated using change of a refractive index only.

EXAMPLE 3

Fabrication of an Optical Waveguide Array From a Glass Dispersing Ag Mircroparticles Therein $SiO_2$, $CaCO_3$, $Na_2CO_3$, $Ag_2O$, SnO raw materials were weighed and mixed to prepare glass composition of 72 parts by weight $SiO_2$, 20 parts by weight CaO, 8 parts by weight $Na_2O$, 0.4 parts by weight Ag, 0.2 parts by weight SnO.

The powdery mixture (400 g) was put in a Pt crucible of 300 cc capacity and melted under a tilting condition 2 hours at 1450° C. in the open air.

Uniform glass melt was molded to a sheet by the same way as Example 1. The glass sheet was set in an electric oven, heated at 5° C./minute, held 4 hours at 550° C. and then cooled as such in the oven to precipitate Ag micropar-ticles. The glass sheet was colored to yellow due to precipi-tation of Ag microparticles. After the heat-treated glass sheet was trimmed and ground, a glass sample of 10 mm in length, 10 mm in width and 3 mm in thickness was cut of the glass sheet.

The glass sample was examined by absorption spectrum analysis. Its permeability to a laser beam of wavelength shorter than 420 nm was 0%.

The glass sample 7 was irradiated with a condensed pulsed laser beam 5 by the same way as Example 1. Increase of a refractive index by 0.01 at the focal point 6 was recognized by observation of the irradiated glass sample 7. A straight optical waveguide 11 was formed in an inner part of the glass sample 7 by relative movement of the glass sample 7 or the focal point 6 along one direction. Change of a refractive index at the focal point 6 as well as decrease of characteristic absorption were also performed in a very short time period of nanosecond or picosecond order.

Figure 6C:
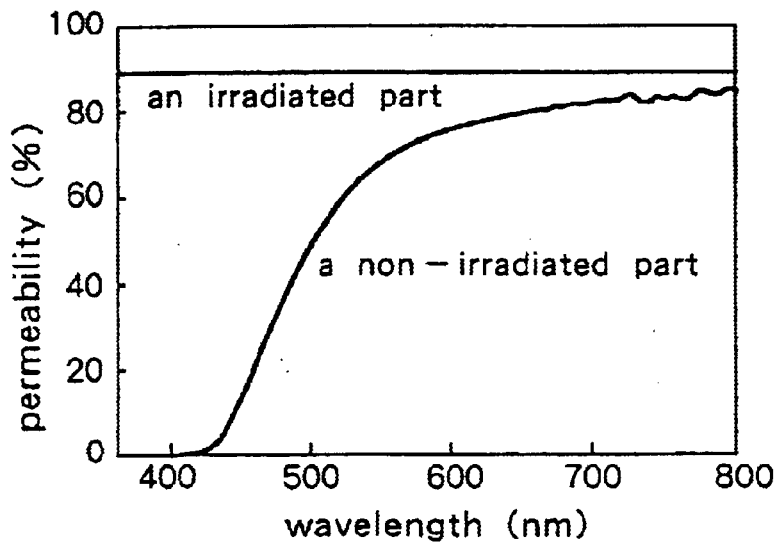
FIG. 6C is a graph showing a absorption spectrum of a glass dispersing Ag microparticles therein at a part irradiated with a condensed laser beam in comparison with a non-irradiated part.

Formation of the optical waveguide 11 was recognized by actually emitting a laser beam of 800 nm wavelength and observing travel of the laser beam only through a domain where change of a refractive index occurred. A near-field image proved that the optical waveguide 11 had cross section of 15 μm in diameter (core diameter). FIG. 6C shows a measurement result of absorption spectrum of the optical waveguide 11. Decrease of an absorption coefficient in a wavelength region of approximately 420–360 nm caused by Ag microparticles is noted in FIG. 6C, and such the domain was not tinged with yellow. On the other hand, change of permeability was not detected at the non-irradiated part 19.

Second and following optical waveguides indicated by 12 . . . were formed in parallel to the first optical waveguide 11 by the same way as Example 1, to fabricate an optical waveguide array. The optical waveguide array was exam-ined by a test to research read-out contrast using a laser beam of 420 nm. As a result, the optical waveguide array performed extremely high contrast, compared with an opti-cal waveguide array (under-mentioned Comparative Example 2) array using change of a refractive index only.

EXAMPLE 4

Fabrication of an Optical Waveguide Array From a Glass Dispersing Pt Microparticles Therein $SiO_2$, $B_2O_3$, $Na_2CO_3$ and $Sb_2O_3$ raw materials were weighed and mixed together, and an aqueous platinic chlo-ride solution was added to the powdery mixture to prepare glass composition of 72 parts by weight $SiO_2$, 18 parts by weight $B_2O_3$, 10 parts by weight $Na_2O$, 2 parts by weight $Sb_2O_3$ and 0.05 parts by weight Pt.

The powdery mixture (400 g) was put in a Pt crucible and melted under a tilting condition 2 hours at 1450° C. in the open air. Uniform glass melt was molded to a glass sheet by the same way as Example 1. The glass sheet was set in an electric oven, heated at 5° C./minute, held 4 hours at 600° C. and then cooled as such in the oven to precipitate Pt microparticles. The glass sheet was colored to gray due to precipitation of Pt microparticles. After the glass sheet was trimmed and ground, a sample of 10 mm in length, 10 mm in width and 4 mm thickness was cut off the glass sheet.

The glass sample was examined by absorption spectrum analysis. Its permeability to visible light of 750–400 nm is at a relatively low level of 20% in average.

The glass sample 7 was then irradiated with a condensed pulsed laser beam 5 by the same way as Example 1. Increase of a refractive index by 0.01 at the focal point 6 was recognized by observation of the irradiated glass sample 7. A straight optical waveguide 11 was formed in an inner part of the glass sample 7 by relative movement of the glass sample 7 or the focal point 6 along one direction. Change of a refractive index at the focal point 6 as well as decrease of characteristic absorption were performed in a very short time period of nanosecond or picosecond order, also in this case.

Formation of the optical waveguide 11 was recognized by actually emitting a laser beam of 800 nm wavelength to the glass sample 7 and observing travel of the laser beam only through a domain where change of a refractive index occurred. A near-field image proved that the optical waveguide 11 had cross section of 15 μm in diameter (core diameter). Decrease of an absorption coefficient in a wavelength region of approximately 750–400 nm caused by Pt microparticles was recognized from a measurement result of absorption spectrum, and such the domain was not tinged with gray. On the other hand, change of permeability was not detected at the non-irradiated part 19.

Figure 4:
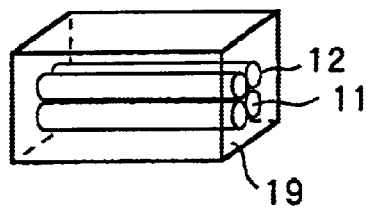
FIG. 4 is a schematic view illustrating an optical waveguide array having the structure that a plurality of domains where change of an refractive index as well as decrease of characteristic absorption in a wavelength region longer than 360 nm occur are continuously formed in a glass with characteristic absorption in the wavelength region longer than 360 nm.

Second and following optical waveguides indicated by 12 . . . were formed in parallel to the first optical waveguide 11 by the same way as Example 1, to fabricate an optical waveguide array (shown in FIG. 4). The optical waveguide array was examined by a test to research read-out contrast using a laser beam of 600 nm wavelength. As a result, the optical waveguide performed extremely high contrast, com-pared with an optical waveguide (under-mentioned Com-parative Example 2) array using change of a refractive index only.

EXAMPLE 5

Fabrication of an Optical Waveguide Array From a Glass Dispersing CuCl Microparticles Therein $SiO_2$, $Al_2O_3$, $B_2O_3$, $Li_2CO_3$, $Na_2CO_3$, $K_2CO_3$, CuCl and SnO raw materials were weighed and mixed together, to prepare glass composition of 65 parts by weight $SiO_2$, 6 parts by weight $Al_2O_3$, 17 parts by weight $Ba_2O_3$, 4 parts by weight $Li_2O$, 4 parts by weight $Na_2O$, 4 parts by weight $K_2O$, 0.5 parts by weight CuCl and 0.2 parts by weight SnO.

The powdery mixture (400 g) was put in a Pt crucible of 300 cc capacity and melted under a tilting condition 2 hours at 1450° C. in the open air. Uniform glass melt was molded to a glass sheet by the same way as Example 1. The glass sheet was set in an electric oven, heated at 5° C./minute, held 4 hours at 550° C. and then cooled as such in the oven to precipitate CuCl microparticles. After the glass sheet was trimmed and ground, a glass sample of 10 mm in length, 10 mm in width and 4 mm thickness was cut off the glass sheet.

The glass sample was examined by absorption spectrum analysis. Its permeability to light of wavelength shorter than 380 nm was 0%.

The glass sample 7 was then irradiated with a condensed pulsed laser beam 5 by the same way as Example 1. Increase of a refractive index by 0.01 at the focal point 6 was recognized by observation of the irradiated glass sample 7. A straight optical waveguide 11 was formed in an inner part of the glass sample 7 by relative movement of the glass sample 7 or the focal point 6 along one direction. Change of a refractive index at the focal point 6 as well as decrease of characteristic absorption were performed in a very short time period of nanosecond or picosecond order, also in this case.

Formation of the optical waveguide 11 was recognized by actually emitting a laser beam of 800 nm wavelength to the glass sample 7 and observing travel of the laser beam only through a domain where change of a refractive index occurred. A near-field image at an outlet side proved that the optical waveguide 11 had cross section of 15 μm in diameter (core diameter). Decrease of an absorption coefficient in a wavelength region of approximately 360–380 nm caused by CuCl microparticles was recognized from a measurement result of absorption spectrum. On the other hand, change of permeability was not detected at the non-irradiated part 19.

The same change of a refractive index as well as the same decrease of characteristic absorption in a wavelength region longer than 360 nm were also detected, when the glass sample 7 was irradiated with a second harmonic of 400 nm wavelength or a laser beam of 1.3 μm or 1.55 μm in a wavelength region for commercial transmission instead of the laser beam of 800 nm wavelength.

Second and following optical waveguides indicated by 12 . . . were formed in parallel to the first optical waveguide 11 by the same way as Example 1, to fabricate an optical waveguide array (shown in FIG. 4). The optical waveguide array was examined by a test to research read-out contrast using a laser beam of 380 nm. As a result, the optical waveguide array performed extremely high contrast, compared with an optical waveguide array (under-mentioned Comparative Example 3) using change of a refractive index only.

EXAMPLE 6

Fabrication of an Optical Waveguide From a Glass Containing $Co^{2+}$ Ion $SiO_2$, $B_2O_3$, $Na_2O_3$ and CoO raw materials were weighed and mixed together to prepare glass composition of 72 parts by weight $SiO_2$, 20 parts by weight $B_2O_3$, 8 parts by weight $Na_2O$ and 0.05 parts by weight CoO. The powdery mixture (400 g) was put in a Pt crucible of 300 cc capacity, and melted under a tilting condition 2 hours at 1450° C. in the open air. Uniform glass melt was poured in a brass die and shaped to a sheet of 6 mm in thickness. After the glass sheet was cooled, it was annealed at 450° C. to release strains. After the annealed glass sheet was trimmed and ground, and a glass sample of 10 mm in length, 10 mm in width and 2 mm in thickness was cut off the glass sheet.

The glass sample was examined by absorption spectrum analysis. Its permeability to light of 550–700 nm was 0% due to inclusion of $Co^{2+}$ which had an absorption band in a wavelength region of 550–700 nm.

The glass sample 7 was then irradiated with a condensed pulsed laser beam 5 by the same way as Example 1. Increase of a refractive index by 0.01 at the focal point 6 was recognized by observation of the irradiated glass sample 7. A straight optical waveguide 11 was formed in an inner part of the glass sample 7 by relative movement of the glass sample 7 or the focal point 6 along one direction. Change of a refractive index at the focal point 6 as well as decrease of characteristic absorption were performed in a very short time period of nanosecond or picosecond order, also in this case.

Formation of the optical waveguide 11 was recognized by actually emitting a laser beam of 800 nm wavelength to the glass sample 7 and observing travel of the laser beam only through a domain where change of a refractive index occurred. A near-field image at an outlet side proved that the optical waveguide 11 had cross section of 15 μm in diameter (core diameter). Decrease of an absorption coefficient in a wavelength region of approximately 700–550 nm caused by $Co^{2+}$ ion was recognized from a measurement result of absorption spectrum, and the domain was not tinged with blue. On the other hand, change of permeability was not detected at the non-irradiated part 19.

Second and following optical waveguides indicated by 12 . . . were formed in parallel to the first optical waveguide 11 by the same way as Example 1, to fabricate an optical waveguide array (shown in FIG. 4). The optical waveguide array was examined by a test to research read-out contrast using a laser beam of 650 nm wavelength. The optical waveguide array performed extremely high contrast, compared with an optical waveguide array (under-mentioned Comparative Example 1) using change of a refractive index only.

EXAMPLE 7

Fabrication of an Optical Waveguide Array From a Glass Containing $Ni^{2+}$ ion $So_2$, $B_2O_3$, $Na_2O_3$ and NiO raw materials were weighed and mixed together to prepare glass composition of 72 parts by weight $SiO_2$, 20 parts by weight $B_2O_3$, 8 parts by weight $Na_2O$, 0.2 parts by weight NiO. The powdery mixture (400 g) was put in a Pt crucible of 300 cc capacity, and melted under a tilting condition 2 hours at 1450° C. in the open air. Uniform glass melt was poured in a Pt die and shaped to a sheet by the same way as Example 6. After the glass sheet was trimmed and ground, a glass sample of 10 mm in length, 10 mm in width and 5 mm in thickness was cut off the glass sheet.

The glass sample was examined by absorption spectrum analysis. Its permeability to light of 450–550 nm was 0% due to inclusion of $Ni^{2+}$ which had an absorption band in a wavelength region of 450–550 nm.

The glass sample 7 was then irradiated with a condensed pulsed laser beam 5 by the same way as Example 1. Increase of a refractive index by 0.01 at the focal point 6 was recognized by observation of the irradiated glass sample 7. A straight optical waveguide 11 was formed in an inner part of the glass sample 7 by relative movement of the glass sample 7 or the focal point 6 along one direction. Change of a refractive index at the focal point 6 as well as decrease of characteristic absorption were performed in a very short time period of nanosecond or picosecond order, also in this case.

Formation of the optical waveguide 11 was recognized by actually emitting a laser beam of 800 nm wavelength to the glass sample 7 and observing travel of the laser beam only through a domain where change of a refractive index occurred. A near-field image at an outlet side proved that the optical waveguide 11 had cross section of 15 μm in diameter (core diameter). Decrease of an absorption coefficient in a wavelength region of approximately 650–450 nm caused by $Ni^{2+}$ ion was recognized from a measurement result of absorption spectrum, and the domain was not tinged with brown. On the other hand, change of permeability was not detected at the non-irradiated part 19.

Second and following optical waveguides 12 . . . were formed in parallel to the first optical waveguide 11 by the same way as Example 1, to fabricate an optical waveguide array (shown in FIG. 4). The optical waveguide array was examined by a test to research read-out contrast using a laser beam of 550 nm wavelength. The optical waveguide array performed extremely high contrast, compared with an optical waveguide array (under-mentioned Comparative Example 1) using change of a refractive index only.

EXAMPLE 8

Fabrication of an Optical Waveguide Array From a Glass Containing $Pr^{3+}$ ion $ZrF_4$, $BaF_2$, $LaF_3$, $AlF_3$, NaF and $PrF_3$ raw materials were weighed and mixed together to prepare glass composition of 53 mol % $ZrF_4$, 20 mol % $BaF_2$, 4 mol % $LaF_3$, 3 mol % $AlF_3$, 20 mol % NaF and 1 mol % $PrF_3$.

The powdery mixture (500 g) was put in a Pt crucible of 300 cc capacity, and melted under a tilting condition 1 hour at 900° C. in a nitrogen atmosphere. Uniform glass melt was poured in a brass die, shaped to a sheet of 5 mm in thickness, and then cooled. The glass sheet obtained in this way was annealed at 260° C. to release strains. After the annealed glass sheet was trimmed and ground, a sample of 10 mm in length, 10 mm in width and 3 mm in thickness was cut off the glass sheet.

The glass sample was examined by absorption spectrum analysis. Its permeability to light of 450–550 nm was 5% due to inclusion of $Pr^{3+}$ which had an absorption band in a wavelength region of 450–550 nm.

The glass sample 7 was then irradiated with a condensed pulsed laser beam 5 by the same way as Example 1. Increase of a refractive index by 0.01 at the focal point 6 was recognized by observation of the irradiated glass sample 7. A straight optical waveguide 11 was formed in an inner part of the glass sample 7 by relative movement of the glass sample 7 or the focal point 6 along one direction. Change of a refractive index at the focal point 6 as well as decrease of characteristic absorption were performed in a very short time period of nanosecond or picosecond order, also in this case.

Formation of the optical waveguide 11 was recognized by actually emitting a laser beam of 800 nm wavelength to the glass sample 7 and observing travel of the laser beam only through a domain where change of a refractive index occurred. A near-field image at an outlet side proved that the optical waveguide 11 had cross section of 15 μm in diameter (core diameter). Decrease of an absorption coefficient in a wavelength region of approximately 550–450 nm caused by $Pr^{3+}$ ion was recognized from a measurement result of absorption spectrum, and the domain was not tinged with yellowish green. On the other hand, change of permeability was not detected at the non-irradiated part 19.

Second and following optical waveguides 12 . . . were formed in parallel to the first optical waveguide 11 by the same way as Example 1, to fabricate an optical waveguide array (shown in FIG. 4). The optical waveguide array was examined by a test to research read-out contrast using a laser beam of 500 nm wavelength. The optical waveguide array performed extremely high contrast, compared with an optical waveguide array (under-mentioned Comparative Example 4) array using change of a refractive index only.

COMPARATIVE EXAMPLE 1

$SiO_2$, $B_2O_3$, $Na_2O$ and $Sb_2O_3$ raw materials were weighed and mixed together to form the same glass matrix as Example 1 except absence of Au (i.e. 72 parts by weight $SiO_2$, 18 parts by weight $B_2O_3$, 10 parts by weight $Na_2O$ and 4 parts by weight $Sb_2O_3$). The powdery mixture (400 g) was put in a Pt crucible of 300 cc capacity, and melted under a tilting condition 2 hour at 1450° C. in the open air. Uniform glass melt was poured in a brass die, shaped to a sheet of 5 mm in thickness, and then cooled. The glass sheet obtained in this way was annealed at 450° C. to release strains. After the annealed glass sheet was trimmed and ground, a glass sample of 4 mm thickness was cut off the glass sheet.

The glass sample was irradiated with a condensed pulsed laser beam under the same conditions as Example 1, to form an optical waveguide in an inner part of the glass sample.

Figure 5:
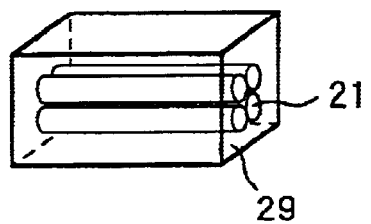
FIG. 5 is a schematic view illustrating an optical waveguide array having the structure that a plurality of domains where change of a refractive index occurs are continuously formed in a glass without characteristic absorption in a wavelength region longer than 360 nm.

Formation of a domain 21 (shown in FIG. 5) where change of a refractive index occurred was recognized by observation of the irradiated glass sample. Such the change of a refractive index was not detected at a non-irradiated part 29. A plurality of optical waveguides were formed in the same way as Example 1, to fabricate an optical waveguide array. The optical waveguide array was examined by a test to research read-out contrast using light of 550 nm. Due to cross talk, the read-out contrast was very weak compared with Example 1, since change of a refractive index only was effective for read-out without decrease of characteristic absorption derived from valence change of Au.

COMPARATIVE EXAMPLE 2

$SiO_2$, $CaCO_3$, $Na_2CO_3$ and SnO raw materials were weighed and mixed together to form the same glass matrix as Example 3 except absence of Ag (i.e. 72 parts by weight $SiO_2$, 20 parts by weight CaO, 8 parts by weight $Na_2O$ and 0.2 parts by weight SnO). The powdery mixture (400 g) was put in a Pt crucible of 300 cc capacity and melted under a tilting condition 2 hour at 1450° C. in the open air. Uniform glass melt was cast to a sheet by the same way as Example 3. After the glass sheet was trimmed and ground, a glass sample of 3 mm in thickness was cut off the glass sheet.

The glass sample was irradiated with a condensed pulsed laser beam under the same conditions as Example 3, to form an optical waveguide in an inner part of the glass sample.

Formation of a domain 21 (shown in FIG. 5) where change of a refractive index occurred was recognized by observation of the irradiated glass sample. Such the change of a refractive index was not detected at a non-irradiated part 29. A plurality of optical waveguides were formed in the same way as Example 3, to fabricate an optical waveguide array. The optical waveguide array was examined by a test to research read-out contrast using light of 420 nm. The read-out contrast was very weak compared with Example 3, since change of a refractive index only was effective for read-out without decrease of characteristic absorption.

COMPARATIVE EXAMPLE 3

$SiO_2$, $Al_2O_3$, $B_2O_3$, $LiCO_3$, $Na_2O_3$, $K_2CO_3$ and SnO raw materials were weighed and mixed together to form the same glass matrix as Example 5 except absence of CuCl microparticles (i.e. 65 part by weight $SiO_2$, 6 parts by weight $Al_2O_3$, 17 parts by weight $B_2O_3$, 4 parts by weight $Li_2O$, 4 parts by weight $Na_2O$, 4 parts by weight $K_2O$ and 0.2 parts by weight SnO). The powdery mixture (400 g) was put in a Pt crucible of 300 cc capacity, and melted under a tilting condition 2 hour at 1450° C. in the open air. Uniform glass melt was cast to a sheet by the same way as Example 5. After the glass sheet was trimmed and ground, a glass sample of 4 mm thickness was cut off the glass sheet.

The glass sample was irradiated with a condensed pulsed laser beam under the same conditions as Example 5, to form an optical waveguide in an inner part of the glass sample.

Formation of a domain 21 (shown in FIG. 5) where change of a refractive index occurred was recognized by observation of the irradiated glass sample. Such the change of a refractive index was not detected at a non-irradiated part 29. A plurality of optical waveguides were formed in the same way as Example 5, to fabricate an optical waveguide array. The optical waveguide array was examined by a test to research read-out contrast using light of 380 nm. The read-out contrast was very weak compared with Example 5, since change of a refractive index only was effective for read-out without decrease of characteristic absorption.

COMPARATIVE EXAMPLE 4

High-purity $ZrF_4$, $BaF_2$, $LaF_3$, $AlF_3$ and NaF raw materials were weighed and mixed together to form the same glass matrix as Example 8 except absence of $PrF_3$ (i.e. 53 mol % $ZrF_4$, 20 mol % $BaF_2$, 4 mol % $LaF_3$, 3 mol % $AlF_3$ and 20 mol % NaF). The powdery mixture (400 g) was put in a Pt crucible of 300 cc capacity, and melted under a tilting condition 2 hour at 900° C. in a nitrogen atmosphere. Uniform glass melt was poured in a brass die and cast to a sheet of 5min in thickness. After the glass sheet was cooled, it was annealed at 260° C. to release strains. A glass sample of 3 mm in thickness similar to Example 8 was cut off the glass sheet.

The glass sample was irradiated with a condensed pulsed laser beam under the same conditions as Example 8, to form an optical waveguide in an inner part of the glass sample.

Formation of a domain 21 (shown in FIG. 5) where change of a refractive index occurred was recognized by observation of the irradiated glass sample. Such the change of a refractive index was not detected at a non-irradiated part 29. A plurality of optical waveguides were formed in the same way as Example 8, to fabricate an optical waveguide array. The optical waveguide array was examined by a test to research read-out contrast using light of 500 nm. The read-out contrast was very weak compared with Example 8, since change of a refractive index only was effective for read-out without decrease of characteristic absorption.

INDUSTRIAL APPLICATION

According to the present invention as above-mentioned, a glass with characteristic absorption in a wavelength region longer than 360 nm is irradiated with a pulsed laser beam which is condensed at a focal point preset in an inner part of the glass, to form a continuous domain acting as an optical waveguide due to change of a refractive index as well as decrease of characteristic absorption in a wavelength longer than 360 nm. An optical waveguide array is fabricated by formation of a plurality of such the waveguides. Since the optical waveguide array fabricated in this way has the structure that the waveguides are surrounded with non-irradiated parts capable of absorbing the leaked light and greatly different in optical properties, it is used as a product with a high reliability without occurrence of cross-talk. In addition, such the optical waveguide array can be fabricated with high productivity by a simplified process, compared with a conventional optical waveguide array provided with a light-absorbing layer. Furthermore, wavelength of light to be transmitted without cross-talk can be freely predetermined by proper selection of a glass with characteristic absorption in a wavelength region longer than 360 nm.

What is claimed is:

1. An optical waveguide array comprising a glass matrix which contains one or more absorbing materials selected from the group consisting of metal microparticles, semiconductor microparticles, transition metal ion, rare earth ion and an anion, and having a plurality of domains each continuously formed in said glass matrix by irradiation with a pulsed laser beam condensed at a focal point preset in an inner part of said glass matrix to induce change of a refractive index as well as decrease of characteristic absorption in a wavelength region for the visible range.

2. The optical waveguide array as claimed in claim 1, wherein the metal microparticles are selected from the group consisting of Au, Ag, Cu and Pt; the semiconductor microparticles are selected from the group consisting of CdS, CdSe, CdTe, CuCl, CuBr, ZnS and ZnSe; the transition metal ion is selected from the group consisting of $Cu^{2+}$, $V^{3+}$, $V^{4+}$, $Ti^{3+}$, $Ni^{2+}$, $Co^{2+}$, $Fe^{2+}$, $Fe^{3+}$, $Mn^{2+}$, $Mn^{3+}$, $Cr^{3+}$, $Cr^{6+}$ and $Mo^{4+}$; the rare earth ion is selected from the group consisting of $Pr^{3+}$, $Nd^{3+}$, $Sm^{3+}$, $Eu^{3+}$, $Dy^{3+}$, $Ho^{3+}$, $Er^{3+}$, $Tm^{3+}$, $Sm^{2+}$ and $Eu^{2+}$; and the anion is selected from the group consisting of $OH^-$, $O_2^-$ and $F^-$.

3. A method of fabricating an optical waveguide array, which comprises the steps of:

providing a glass containing one or more of absorbing materials with characteristic absorption in a wavelength region for the visible range, said absorbing materials being selected from the group consisting of metal microparticles, semiconductor microparticles, transition metal ion, rare earth ion and anion;

irradiating said glass with a pulsed laser beam with an energy sufficient to induce change of a refractive index as well as decrease of characteristic absorption in said wavelength region for the visible range, in the manner such that a focal point of said pulsed laser beam is preset in an inner part of said glass;

relatively shifting said focal point in the inner part of said glass to form a continuous domain where change of a refractive index as well as decrease of characteristic absorption in said wavelength region for the visible range occur;

relocating said focal point; and repeating the irradiation with said laser beam to form a plurality of waveguides in the inner part of said glass.

4. The method of fabricating an optical waveguide array as claimed in claim 3, wherein the metal microparticles are selected from the group consisting of Au, Ag, Cu and Pt; the semiconductor microparticles are selected from the group consisting of CdS, CdSe, CdTe, CuCl, CuBr, ZnS and ZnSe; the transition metal ion is selected from the group consisting of $Cu^{2+}$, $V^{3+}$, $V^{4+}$, $Ti^{3+}$, $Ni^{2+}$, $Co^{2+}$, $Fe^{2+}$, $Fe^{3+}$, $Mn^{2+}$, $Mn^{3+}$, $Cr^{3+}$, $Cr^{6+}$, and $Mo^{4+}$; the rare earth ion is selected from the group consisting of $Pr^{3+}$, $Nd^{3+}$, $Sm^{3+}$, $Eu^{3+}$, $Dy^{3+}$, $Ho^{3+}$, $Tm^{3+}$, $Sm^{3+}$, and $Eu^{2+}$; and the anion is selected from the group consisting of $OH^-$, $O_2^-$ and $F^-$.

* * * * *

UNITED STATES PATENT AND TRADEMARK OFFICE
CERTIFICATE OF CORRECTION

| | |
|---|---|
| PATENT NO. | : 6,640,039 B1 |
| APPLICATION NO. | : 09/601811 |
| DATED | : October 28, 2003 |
| INVENTOR(S) | : Kiyotaka Miura et al. |

It is certified that error appears in the above-identified patent and that said Letters Patent is hereby corrected as shown below:

<u>Title Page</u>
    [56] References Cited Foreign Patent Documents, insert --JP 08-334641 12/1996 --.

<u>Column 6</u>
    Line 35 "12. parallel" should read --12 each parallel--.
    Line 37 "11 and 12 …" should read --11 and 12--.
    Line 47 "12 …" should read --12--.
    Line 51 "11 and 12 …" should read --11 and 12--.

<u>Column 8</u>
    Line 4 "11 and 12 …" should read --11 and 12--.
    Lines 60-61 "12 …" should read --12--.
    Line 65 "11 and 12 …" should read --11 and 12--.

<u>Column 9</u>
    Line 54 "12 …" should read --12--.

<u>Column 10</u>
    Line 43 "12 …" should read --12--.

<u>Column 11</u>
    Line 39 "12 …" should read --12--.

UNITED STATES PATENT AND TRADEMARK OFFICE
CERTIFICATE OF CORRECTION

PATENT NO. : 6,640,039 B1
APPLICATION NO. : 09/601811
DATED : October 28, 2003
INVENTOR(S) : Kiyotaka Miura et al.

It is certified that error appears in the above-identified patent and that said Letters Patent is hereby corrected as shown below:

Column 12
  Line 26 "12 ..." should read --12--.

Column 15
  Line 36 "Smin" should read --5mm--.

Signed and Sealed this

Twenty-first Day of November, 2006

JON W. DUDAS
*Director of the United States Patent and Trademark Office*